Jan. 23, 1945.     H. J. COLMAN     2,367,929

SELF-LOCKING NUT

Filed April 3, 1944

Inventor
H. J. Colman
By
Attorneys

Patented Jan. 23, 1945

2,367,929

UNITED STATES PATENT OFFICE 2,367,929

SELF-LOCKING NUT

Henry James Colman, Addlestone, England

Application April 3, 1944, Serial No. 529,312
In Great Britain May 24, 1943

9 Claims. (Cl. 151—14)

This invention relates to self-locking nuts and other machine parts formed with female screw threads, and its object is to provide a simple and cheap form of nut or other screw-threaded part which provides a positive lock, that is to say, that a definite force has to be overcome to unscrew it, as distinguished from mere increased friction between the male and female screw threads.

According to the present invention, the nut is fitted with a locking ring which is obliged to move axially with the nut without rotating with the nut, and is formed with one or more teeth or projections so located as to be forced through the screw-thread of the bolt when the nut is screwed up. The resulting burring or interference of the thread may be relied on for the locking, but it is preferred to make the locking ring as a spring ring with projections which, when the nut is tightened, engage in the thread of the bolt, or in axial grooves or other recesses in the nut so as to prevent rotation of the nut without exerting a definite force. As an alternative, the nut may be locked by springy projections which engage the screw-thread of the bolt, but one or other of which can engage in the keyway cut in the thread when the nut is tightened up. The invention is applicable to the ordinary hexagon nut, but it may also be applied to other forms of nut such as a double anchor or single anchor nut, and so forth.

The invention is more fully explained by considering some forms of construction in which a locking ring is housed in the end of a hexagonal nut, as illustrated by way of example in the accompanying drawings, in which.

Figure 4:
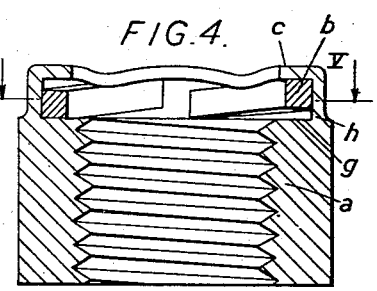
Figure 4 is a central axial section.
Figure 5:
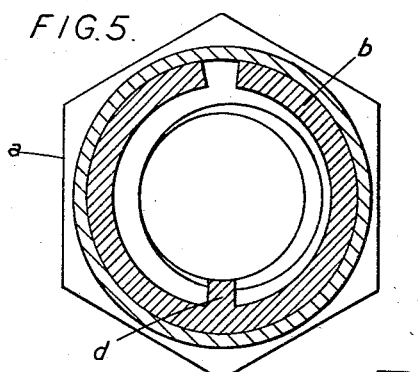
Figure 6:
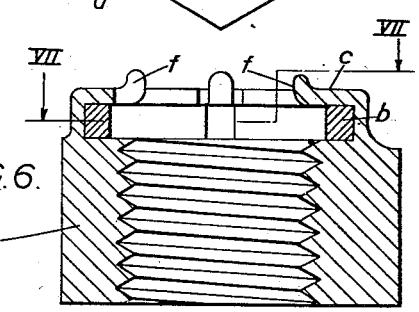
Figure 7:
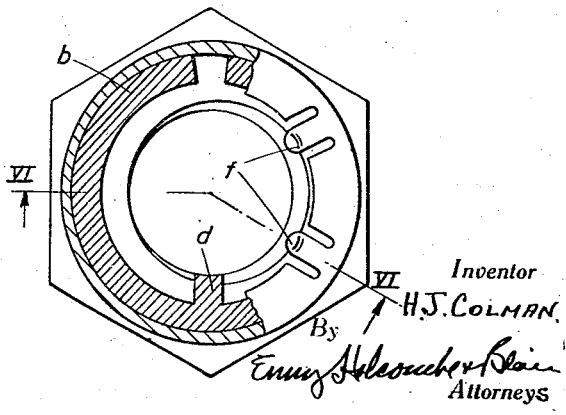

Figure 5 a transverse section on the line V—V in Figure 4 of another form of construction in accordance with the invention; while Figure 6 is an axial section on the line VI—VI in Figure 7; and Figure 7 is a transverse section on the line VII—VII in Figure 6 of yet another form of construction.

In all of the forms shown, the nut a houses a spring ring b in its end, being flanged over at c to retain the ring b and to cause it to move axially along the bolt with the nut. As a matter of fact, the locking ring need not be at the end of the nut but could be recessed into the nut at any point, as long as it moves axially with the nut and is not forced to rotate with the nut. When it is at the end, it can be held in position in various ways, for example, it may be retained by a sheet metal disc separate from the nut but spun over at its edges to engage in an annular groove cut on the outside of the nut, or again, the locking ring itself may have its edge portions spun over into a groove on the outside of the nut. The spring ring b is shown as split in each case but it could be continuous without a gap.

Figure 1:
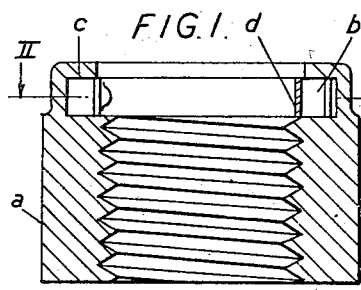
Figure 1 is a central axial section of one form of nut.
Figure 2:
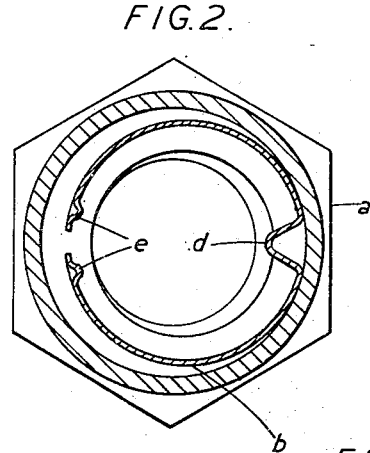
Figure 2 is a transverse section on the line II—II in Figure 1.

In Figures 1 and 2, the locking ring b is of deep section of springy metal and is formed with an inturned part d opposite to the split in the ring and which serves as a tooth to cut into the thread of the bolt. It is also formed with a pair of projections or pips e on either side of the split, which can enter between the threads of the bolt when the nut is screwed up.

When the nut is put on the bolt and screwed down, the locking ring b will obviously come into contact with the end of the bolt, and the tooth d will follow round the thread until it becomes jammed. Then, with further screwing on of the nut, the tooth d cuts into the thread of the bolt, forming a keyway which is more or less axial, depending on the resistance to the locking ring b turning. Thus, the tooth d remains in the keyway which it cuts itself, and when the nut is screwed home, the projections e engage in the thread of the bolt. If there is any tendency to loosen the nut by vibration or impact, it is quite clear that the nut cannot unscrew until the projections e have been positively forced out of the screw-thread because otherwise they prevent axial movement of the locking ring b and therefore of the nut a. The locking ring b shown in Figures 1 and 2 and also in the other figures is deep enough to prevent it entering between the top two threads of the bolt when the tooth d would rotate with the nut instead of moving in an axial direction. To make certain of this, the ring b may have a depth of at least twice the screw pitch.

Figure 3:
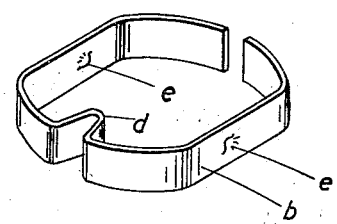
Figure 3 is a perspective view of a modified form of locking ring which can be used in the nut shown in Figures 1 and 2.

The tooth d can take any form, and it and the projections e can be placed in any position around the ring b. Thus, in Figure 3, the ring is shown with two flattened sides, in which the projections e are formed. When the projections e are to engage the male thread as in Figures 2 and 3, they can assume any convenient shape to engage in the threads of the bolt and to spring over the threads with a click.

In Figures 4 and 5, the locking ring b assumes the form of a spring or grover washer, while the tooth d for cutting the keyway in the thread of the bolt assumes a rectangular profile. In this case, the flange c at the end of the nut is formed with a wavy under surface, as shown in Figure 4, the spring washer at its end bearing against this wavy surface so that the engagement provides the positive resistance to the nut turning relatively to the locking ring b when there is any tendency for it to become loosened. Obviously, a similar wavy surface might be formed on the flat surface of the nut at g or on the inside cylindrical wall h of the space in the nut which houses the ring b when it could be engaged by one or more projections on the outside of the locking ring b. The ring b may consist, if desired, of a double spring washer with two or more convolutions and may either be split or continuous and may be formed with an upstanding projection to engage the wavy surface on the nut. Again, instead of the wavy surface, a surface presenting ratchet teeth could be provided in which case, the upstanding end of the grover washer could slip over the teeth when screwing up the nut but would act as a retaining pawl when unscrewing the nut. In such a case, of course, the nut could not be removed without permanent damage.

In Figures 6 and 7, the locking ring b and the cutting tooth d have the same shape as in Figures 4 and 5, except that the ring b is flat. In this case, in order to provide for a positive force to be overcome before the nut can be loosened, the end flange c has a number of inwardly extending radial upturned spring tongues f which are placed so as to engage the thread of the bolt when the nut is tightened. During this process, the tongues f by reason of their shape and material yield, but when the nut is finally tightened, one of them is allowed to spring into the keyway cut by the tooth d, and obviously the nut can only become loosened when a positive force is exerted sufficiently great to disengage the tongue f from the keyway.

It will be seen that in all the constructions illustrated and referred to when sufficient force is exerted by a spanner, there is no difficulty in unscrewing the nut. Furthermore, the only injury to the screw-thread of the bolt is the keyway cut by the tooth d, and if the same nut is screwed on to a bolt a second or third time, the tooth d will enter the same keyway and remain in it while the nut is screwed up. If a different nut were screwed on to the same bolt, its tooth d will obviously tend to enter the same keyway already formed in the screw thread of the bolt and, in practice, often does so.

It should also be mentioned that it is possible for each of the nuts to be formed in a number of parts. Thus, it has already been indicated that the retaining flange c at the end of the nut could be formed as a separate piece secured to the nut and, in Figures 6 and 7, the springy fingers f could be made on a separate part.

Furthermore, as described with reference to Figures 4 and 5, the wavy surface of the nut may be shaped to make the nut non-reversible, that is to say, so that it cannot be unscrewed without permanent damage. This could be applied to other forms described. Thus axial or radial grooves formed in the nut can be shaped to provide a non-reversible action if desired. Similarly the pips e could be shaped to slip over the threads of the bolt when screwing the nut up but to jam when attempting to turn the nut in the other direction. The fingers f in Figures 6 and 7 could also be shaped to provide a similar non-reversible effect or the keyways cut in the bolt thread could be given a shape to produce a similar effect by making the cutting tooth d of an appropriate shape. In this case, of course, the fingers f are in such a position that thy are readily accessible and could be spread apart, say, by a suitably shaped spanner, while unscrewing the nut.

I claim:

1. A machine part having an internal screw-thread, an annular locking member operatively connected to said part so as to be constrained to move therewith axially of said screw-thread but to be free from rotation therewith when said part is screwed on to an externally-threaded part, and means for exerting positive resistance to the turning of said first-mentioned part relatively to said annular locking member when any tendency occurs for said first-named part to become unscrewed, said annular member being formed with at least one tooth projecting from its inner edge so as to be forced through the screw-thread of said externally-threaded part when said first-mentioned part is screwed on to said externally-threaded part.

2. A self-locking nut comprising a body part having an internal screw-thread, a locking ring housed in said body part so as to be constrained to move therewith axially of said screw-thread but to be free from rotation therewith when said body part is screwed on to a bolt, and means for exerting positive resistance to the turning of said body part relatively to said locking ring when any tendency occurs for said body part to become unscrewed from said bolt, said locking ring being formed with at least one tooth projecting from its inner edge so as to be forced through the screw-thread of said bolt when said body part is screwed on to said bolt.

3. A self-locking nut comprising a body part having an internal screw-thread, a spring-locking ring of strip metal housed in said body part so as to be constrained to move therewith axially of said screw-thread but to be free from rotation therewith when said body part is screwed on to a bolt, and means for exerting positive resistance to the turning of said body part relatively to said locking ring when any tendency occurs for said body part to become unscrewed from said bolt, said locking ring being shaped to present an inwardly projecting cutting tooth positioned so as to be forced through the screw-thread of said bolt when said body part is screwed on to said bolt.

4. A self-locking nut comprising a body part having an internal screw-thread, a spring-locking ring of strip metal having a depth of at least double the pitch of said screw-thread and housed in said body part so as to be constrained to move therewith axially of said screw-thread but to be free from rotation therewith when said body part is screwed on to a bolt, and means for exerting positive resistance to the turning of said body part relatively to said locking ring when any tendency occurs for said body part to become unscrewed from said bolt, said locking ring being shaped to present an inwardly projecting cutting tooth positioned so as to be forced through the screw-thread of said bolt when said body part is screwed on to said bolt.

5. A self-locking nut comprising a body part having an internal screw-thread and a locking ring housed in said body part so as to be constrained to move therewith axially of said screw-thread but to be free from rotation therewith when said body part is screwed on to a bolt, said locking ring being formed with at least one tooth projecting from its inner edge so as to be forced through the screw-thread of said bolt when said body part is screwed on to said bolt, and with an integral projection exerting positive resistance to the unscrewing of said body part.

6. A self-locking nut comprising a body part having an internal screw-thread and a locking ring housed in said body part so as to be constrained to move therewith axially of said screw-thread but to be free from rotation therewith when said body part is screwed on to a bolt, said locking ring being formed with at least one tooth projecting from its inner edge so as to be forced through the screw-thread of said bolt when said body part is screwed on to said bolt; and with an integral projection located to yieldingly engage in the screw-thread of said bolt.

7. A self-locking nut comprising a body part having an internal screw-thread and a surface formed with undulations and a spring-locking ring housed in said body part so as to be constrained to move therewith axially of said screw-thread but to be free from rotation therewith when said body part is screwed onto a bolt, said locking ring being formed with at least one tooth projecting from its inner edge so as to be forced through the screw-thread of said bolt when said body part is screwed on to said bolt, and with a part yieldingly engaging said undulations.

8. A self-locking nut comprising a body part having an internal screw-thread and a flanged end formed with undulations on its interior surface and a helically deformed split locking ring housed in said body part within said flanged end and yieldingly engaging said undulations so as to be constrained to move with said body part axially of said screw-thread but to be free from rotation therewith when said body part is screwed on to a bolt, said locking ring being formed with at least one tooth projecting from its inner edge so as to be forced through the screw-thread of said bolt when said body part is screwed on to said bolt.

9. A self-locking nut comprising a body part having an internal screw-thread and formed with a plurality of spring tongues at one end extending inwardly to engage the screw-thread of a bolt when said body part is screwed on to said bolt, and a locking ring housed in said body part so as to be constrained to move axially of said internal screw-thread but to be free from rotation therewith when said body part is screwed on to said bolt, said locking ring being formed with at least one tooth projecting from its inner edge so as to be forced through the screw-thread of said bolt and to cut a substantially axial groove therein when said body part is screwed on to said bolt, whereupon one of said spring tongues is able to enter into and to be disengaged from said groove.

HENRY JAMES COLMAN.